US011423298B2

(12) United States Patent
Umeda

(10) Patent No.: US 11,423,298 B2
(45) Date of Patent: Aug. 23, 2022

(54) COMPUTER-READABLE RECORDING MEDIUM, DETERMINATION METHOD, AND DETERMINATION APPARATUS

(71) Applicant: FUJITSU LIMITED, Kawasaki (JP)

(72) Inventor: Yuhei Umeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 946 days.

(21) Appl. No.: 16/197,833

(22) Filed: Nov. 21, 2018

(65) Prior Publication Data

US 2019/0180178 A1    Jun. 13, 2019

(30) Foreign Application Priority Data

Dec. 8, 2017  (JP) .............................. JP2017-236216

(51) Int. Cl.
| G06K 9/46 | (2006.01) |
| G06N 3/08 | (2006.01) |
| G06V 10/426 | (2022.01) |
| G06V 20/40 | (2022.01) |
| G06K 9/62 | (2022.01) |

(52) U.S. Cl.
CPC ............. G06N 3/08 (2013.01); G06V 10/426 (2022.01); G06V 20/41 (2022.01); G06K 9/6267 (2013.01)

(58) Field of Classification Search
CPC ........ G06N 3/08; G06V 10/426; G06V 20/41; G06K 9/6267
See application file for complete search history.

(56) References Cited

U.S. PATENT DOCUMENTS

| 2003/0065409 A1* | 4/2003 | Raeth ..................... G08B 31/00 700/28 |
| 2007/0036434 A1* | 2/2007 | Saveliev ................ G06V 10/42 382/173 |
| 2010/0260519 A1* | 10/2010 | Kamijo ................ G03G 15/167 399/297 |
| 2016/0255109 A1* | 9/2016 | Koyanagi ........... H04L 63/1425 726/23 |

(Continued)

FOREIGN PATENT DOCUMENTS

| EP | 2918071 B1 * | 5/2017 | ......... G06K 9/00718 |
| JP | 2000250896 A * | 9/2000 | |

(Continued)

OTHER PUBLICATIONS

Automatic recognition and tagging of topologically different regimes in dynamical systems, Jesse J. Berwald et al., arxiv, Mar. 24, 2014, pp. 1-14 (Year: 2014).*

*Primary Examiner* — Jayesh A Patel

(74) *Attorney, Agent, or Firm* — Xsensus LLP

(57) ABSTRACT

A determination apparatus extracts a plurality of specific events that have values greater than an event determination threshold from among a plurality of events that have occurred in chronological order. The determination apparatus generates a feature amount related to adjacent occurrence intervals of the plurality of specific events, using the plurality of specific events. The determination apparatus generates array data corresponding to the plurality of events using points each having components of the event determination threshold and the feature amount, while changing the event determination threshold. The determination apparatus determines a type of the plurality of events using the array data.

7 Claims, 13 Drawing Sheets

(56) References Cited

U.S. PATENT DOCUMENTS

| | | | | |
|---|---|---|---|---|
| 2019/0095716 A1* | 3/2019 | Shrestha | ................ | G06V 20/70 |
| 2019/0122097 A1* | 4/2019 | Shibahara | ............ | G06N 3/0454 |
| 2020/0272848 A1* | 8/2020 | Shimauchi | ............. | G06V 20/10 |

FOREIGN PATENT DOCUMENTS

| | | | | | |
|---|---|---|---|---|---|
| JP | 2002024251 A | * | 1/2002 | | |
| JP | 2007179131 A | * | 7/2007 | ......... | H04L 63/1416 |
| JP | 2010034664 A | * | 2/2010 | | |
| JP | 2011123726 A | * | 6/2011 | | |
| JP | 2013-148966 | | 8/2013 | | |
| JP | 2016-42123 | | 3/2016 | | |
| JP | 2016-95434 | | 5/2016 | | |
| JP | 2017080141 A | * | 5/2017 | | |
| JP | 2017108294 A | * | 6/2017 | | |
| WO | WO-2013145493 A1 | * | 10/2013 | ............... | G01F 1/05 |
| WO | WO-2014074139 A1 | * | 5/2014 | ......... | G06K 9/00718 |
| WO | WO-2014100780 A1 | * | 6/2014 | ......... | G06K 9/00771 |

* cited by examiner

POINT PROCESS DATA

RADIUS: 0

RADIUS: $r_1$

RADIUS: $r_2$

RADIUS: $r_3$

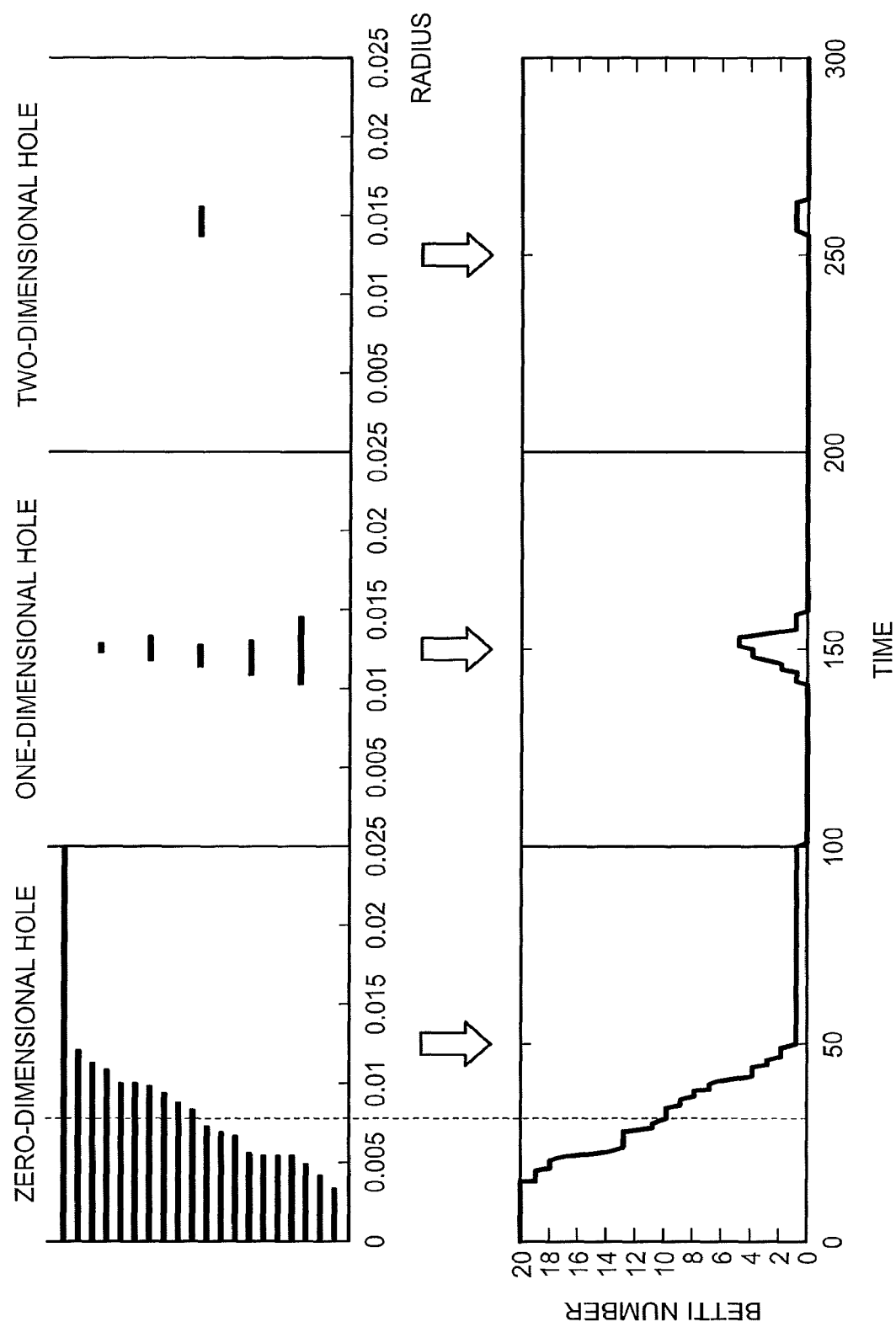

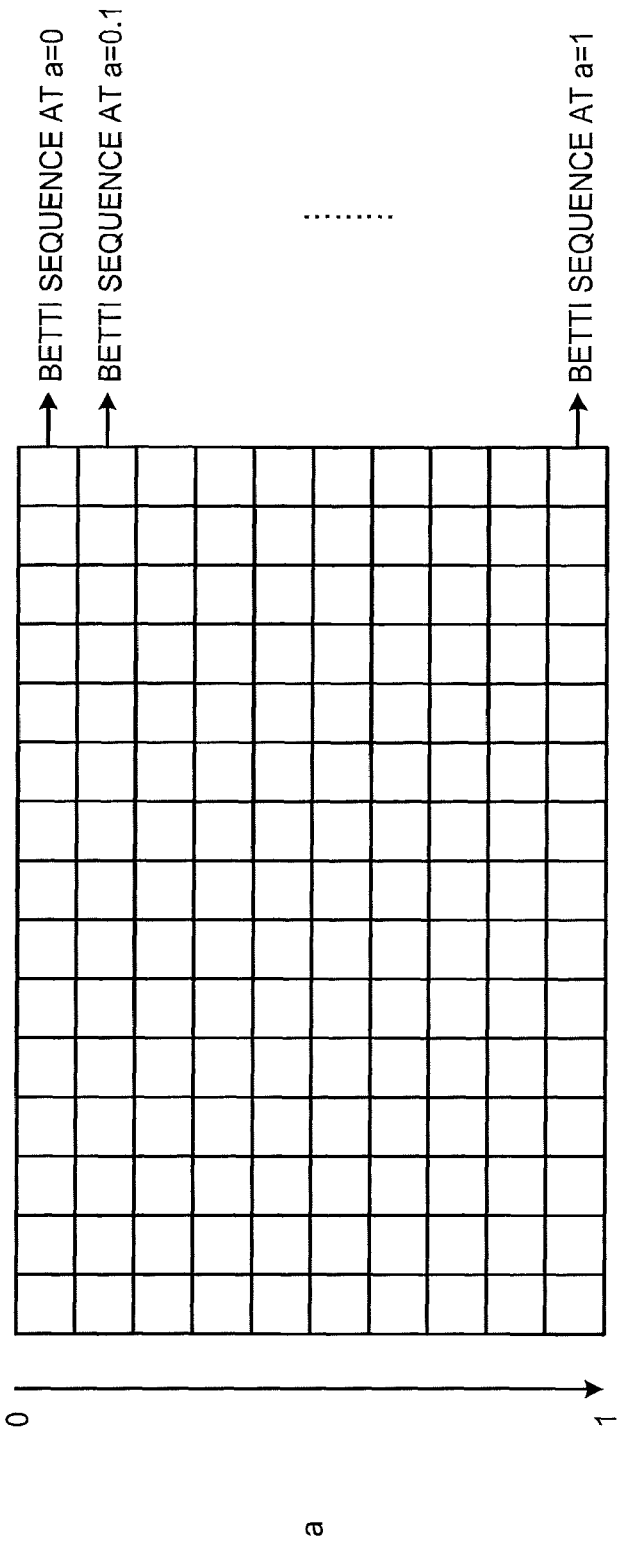

OCCURRENCE INTERVAL

| EVENT VALUE | | NORMAL DISTRIBUTION | UNIFORM DISTRIBUTION |
|---|---|---|---|
| | NORMAL DISTRIBUTION | LABEL 1 | LABEL 2 |
| | SINE FUNCTION | LABEL 3 | LABEL 4 |

FIG.13

OVERALL PERCENTAGE OF CORRECT ANSWERS

|  | GENERAL METHOD | TIME SERIES INTERPOLATION | EMBODIMENT |
|---|---|---|---|
| PERCENTAGE OF CORRECT ANSWERS | 55% | 54% | 100% |

PERCENTAGE OF CORRECT ANSWERS FOR EACH OF LABELS

|  | GENERAL METHOD | TIME SERIES INTERPOLATION | EMBODIMENT |
|---|---|---|---|
| LABEL 1 | 54.6% | 54 | 100% |
| LABEL 2 | 56% | 54.1 | 100% |
| LABEL 3 | 54% | 54.3 | 100% |
| LABEL 4 | 54.6% | 53.7 | 100% |

FIG.14

■GENERAL METHOD — ESTIMATED LABEL

| CORRECT LABEL | | LABEL 1 | LABEL 2 | LABEL 3 | LABEL 4 |
|---|---|---|---|---|---|
| | LABEL 1 | 54.6% | 0% | 45.4% | 0% |
| | LABEL 2 | 0% | 56% | 0% | 44% |
| | LABEL 3 | 46% | 0% | 54% | 0% |
| | LABEL 4 | 0% | 45.4% | 0% | 54.6% |

■TIME SERIES INTERPOLATION — ESTIMATED LABEL

| CORRECT LABEL | | LABEL 1 | LABEL 2 | LABEL 3 | LABEL 4 |
|---|---|---|---|---|---|
| | LABEL 1 | 54% | 46% | 0% | 0% |
| | LABEL 2 | 45.9% | 54.1% | 0% | 0% |
| | LABEL 3 | 0% | 0% | 54.3% | 45.7% |
| | LABEL 4 | 0% | 0% | 46.3% | 53.7% |

■EMBODIMENT — ESTIMATED LABEL

| CORRECT LABEL | | LABEL 1 | LABEL 2 | LABEL 3 | LABEL 4 |
|---|---|---|---|---|---|
| | LABEL 1 | 100% | 0% | 0% | 0% |
| | LABEL 2 | 0% | 100% | 0% | 0% |
| | LABEL 3 | 0% | 0% | 100% | 0% |
| | LABEL 4 | 0% | 0% | 0% | 100% |

COMPUTER-READABLE RECORDING MEDIUM, DETERMINATION METHOD, AND DETERMINATION APPARATUS

CROSS-REFERENCE TO RELATED APPLICATION

This application is based upon and claims the benefit of priority of the prior Japanese Patent Application No. 2017-236216, filed on Dec. 8, 2017, the entire contents of which are incorporated herein by reference.

FIELD

The embodiments discussed herein are related to a computer-readable recording medium storing a determination program, a determination method, and a determination apparatus.

BACKGROUND

A deep learning (DL) technology for automatically classifying time series data has been known. The time series data includes what is called point process time series data that has the characteristic that events occur intermittently and times when the events occur are not predictable. Examples of the point process time series data include heart-rate data, Internet access by customers or the like, product demand data, economic transactions, and earthquake data. Because the point process time series data is the time series data, it is desired to classify the data, such as classifying the heart-rate data according to presence and absence of disease or according to degree of sleepiness or classifying an economic index according to economic status, for example.

In recent years, as a technology related to analysis of the point process time series data, there is a known technology in which intervals between events are adopted as values at the times of occurrence, the interval values are interpolated and converted into time series data, frequency analysis is subsequently performed, and features of the occurrence intervals are extracted. As other technologies, there is a known technology in which occurrence of events is modeled by a Poisson process or the like and the occurrence of events is handled as stochastic data, and there is another known technology in which it is assumed that the occurrence of events is chaotic and a feature amount of chaotic time series is obtained.

Patent Document 1: Japanese Laid-open Patent Publication No. 2016-95434

Patent Document 2: Japanese Laid-open Patent Publication No. 2016-42123

Meanwhile, in the technologies as described above, the feature amount is calculated based on the assumption that event occurrence intervals correspond to a specific model in the point process time series data to be analyzed, and a corresponding event is determined from the point process time series data. However, information on a value of each of the events in the point process time series data is lost, so that the accuracy of the feature amount of the point process time series data is reduced, and, as a result, the accuracy of an event determination result is reduced.

SUMMARY

According to an aspect of an embodiment, a non-transitory computer-readable recording medium stores therein a determination program that causes a computer to execute a process. The process includes extracting a plurality of specific events that have values greater than an event determination threshold from among a plurality of events that have occurred in chronological order; generating a feature amount related to adjacent occurrence intervals of the plurality of specific events, using the plurality of specific events; generating array data corresponding to the plurality of events using points each having components of the event determination threshold and the feature amount, while changing the event determination threshold; and determining a type of the plurality of events using the array data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram for explaining a relationship between barcode data and generated continuous data;

FIG. 8 is a diagram for explaining an example of array display;

FIG. 13 is a diagram for explaining an experimental result;

FIG. 14 is a diagram for explaining details of the experimental result; and

DESCRIPTION OF EMBODIMENTS

Preferred embodiments will be explained with reference to accompanying drawings. The present invention is not limited by the embodiments below. In addition, the embodiments may be combined appropriately as long as no contradiction is derived.

[a] First Embodiment

Overall Configuration

Figure 1:
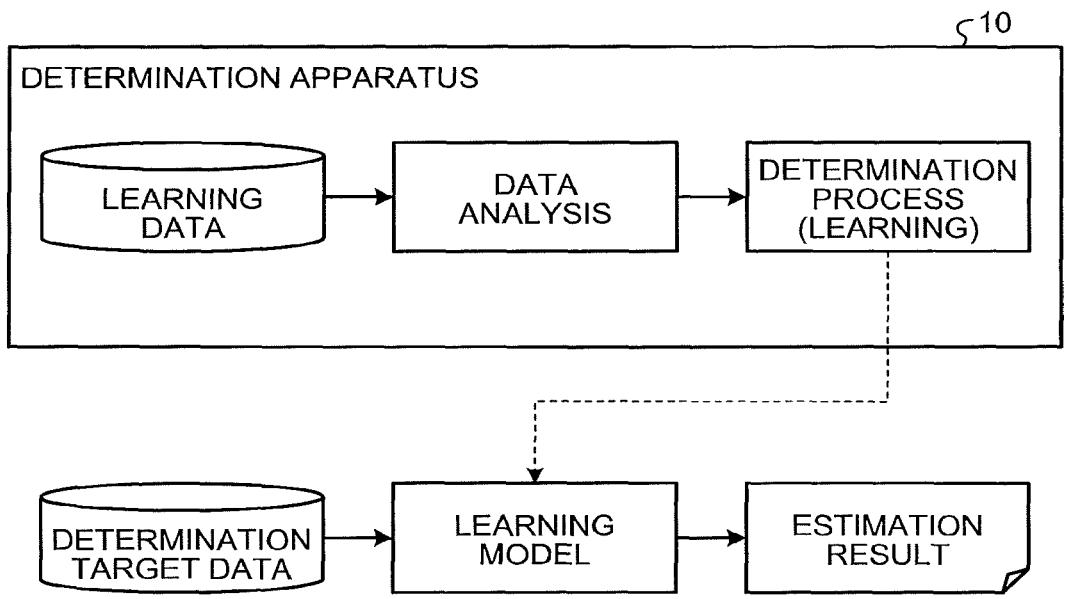
FIG. 1 is a diagram for explaining an example of an entire determination apparatus according to a first embodiment.

FIG. 1 is a diagram for explaining an example of an entire determination apparatus according to a first embodiment. As illustrated in FIG. 1, a determination apparatus 10 according to the first embodiment performs data analysis on learning data, subsequently performs a determination process (learning process) using machine learning, deep learning (DL), or the like, and learns a neural network (NN) or the like so that the learning data can be accurately determined (classified) for each event. Thereafter, by using a learning model to which a learning result is applied, an event (label) of determination target data is estimated with accuracy.

Learning data assumed in the first embodiment described herein is, for example, point process time series data, such as heart-rate data or economic transactions, in which events occur intermittently. As for the learning data, it does not matter whether or not a type of a model corresponding to occurrence intervals is indicated in advance, or whether or not it is indicated in advance that the occurrence intervals are chaotic (meet a nonlinear rule).

In the state as described above, the determination apparatus 10 extracts a plurality of specific events that have values greater than a determination threshold from among a plurality of events that have occurred in chronological order. The determination apparatus 10 generates a feature amount related to adjacent occurrence intervals of the plurality of specific events, from the plurality of specific events. Thereafter, the determination apparatus 10 generates array data corresponding to the plurality of events from points each containing the determination threshold and the feature amount as components, while changing the determination threshold. Then, the determination apparatus 10 determines a type of the plurality of events using the array data.

In other words, the determination apparatus 10 changes the threshold for event values, generates a feature amount related to the adjacent occurrence intervals that are equal to or greater than each of the thresholds, and arranges the feature amounts related to the respective thresholds, to thereby generate feature amounts that reflect both of event occurrence intervals and magnitudes (values) of the event values. The determination apparatus 10 is able to determine events of the point process time series data using the feature amounts generated as described above. Meanwhile, the determination apparatus 10 is one example of a computer apparatus, such as a server, a personal computer, or a tablet. Further, the determination apparatus 10 and an apparatus that executes an estimation process using a learning model may be realized by separate apparatuses or may be realized by a single apparatus.

Functional Configuration

Figure 2:
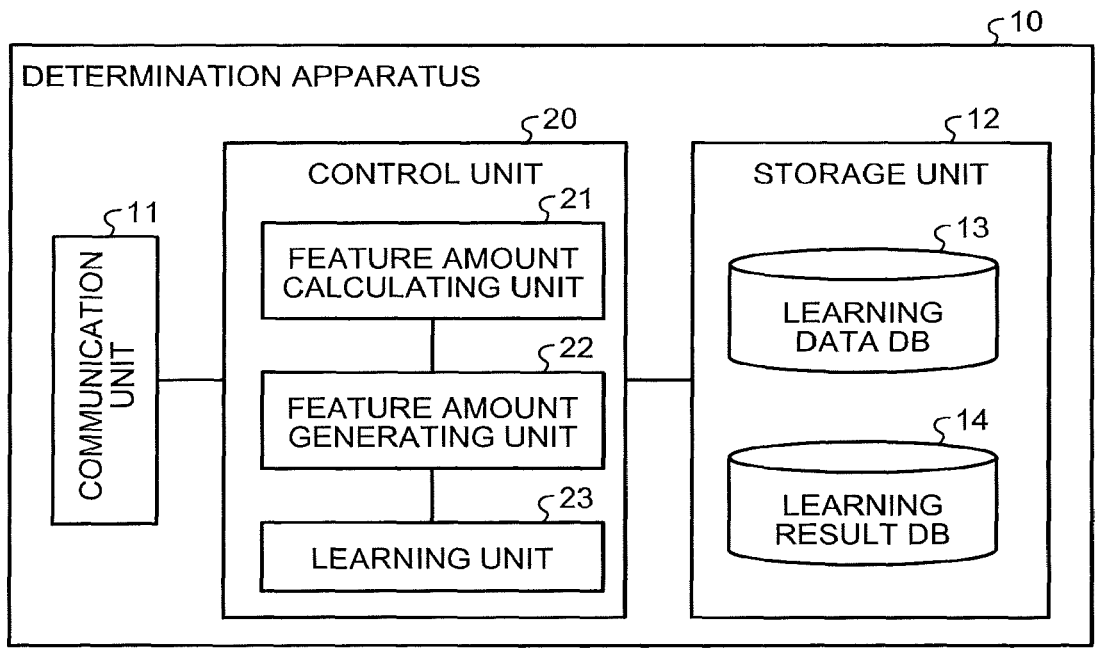
FIG. 2 is a functional block diagram illustrating a functional configuration of the determination apparatus according to the first embodiment.

FIG. 2 is a functional block diagram illustrating a functional configuration of the determination apparatus 10 according to the first embodiment. As illustrated in FIG. 2, the determination apparatus 10 includes a communication unit 11, a storage unit 12, and a control unit 20.

The communication unit 11 is a processing unit that controls communication with other apparatuses, and is, for example, a communication interface. For example, the communication unit 11 receives a process start instruction from a terminal of an administrator. Further, the communication unit 11 receives learning data (input data) from the terminal of the administrator or the like, and stores the learning data in a learning data database (DB) 13.

The storage unit 12 is one example of a storage device that stores therein a program and data, and is, for example, a memory, a hard disk, or the like. The storage unit 12 stores therein the learning data DB 13 and a learning result DB 14.

Figure 3:
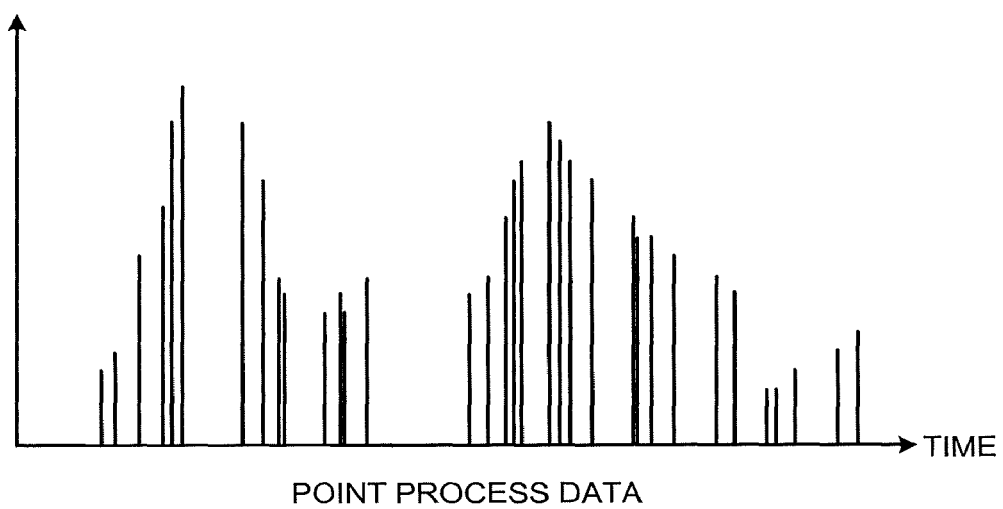
FIG. 3 is a diagram illustrating an example of point process time series data.

The learning data DB 13 is a database for storing data to be learned. Specifically, the learning data DB 13 stores therein data in point process time series (hereinafter, may be described as point process time series data). FIG. 3 is a diagram illustrating an example of the point process time series data. As illustrated in FIG. 3, the point process time series data is data in which events occur intermittently, and is, for example, heart-rate data, earthquake data, or the like. In FIG. 3, the horizontal axis represents time, and the vertical axis represents a magnitude (value) of an event.

The learning result DB 14 is a database for storing a learning result. For example, the learning result DB 14 stores therein a determination result (classification result) of the learning data obtained by the control unit 20, and various parameters learned by machine learning or deep learning.

The control unit 20 is a processing unit that controls the entire process of the determination apparatus 10, and is, for example, a processor or the like. The control unit 20 includes a feature amount calculating unit 21, a feature amount generating unit 22, and a learning unit 23. The feature amount calculating unit 21, the feature amount generating unit 22, and the learning unit 23 are examples of processes that are executed by an electronic circuit included in the processor, the processor, or the like. In addition, the feature amount calculating unit 21 is one example of an extracting unit and a first generating unit, the feature amount generating unit 22 is one example of a second generating unit, and the learning unit 23 is one example of a determining unit.

The feature amount calculating unit 21 is a processing unit that changes a threshold a, which is an event determination threshold for extracting events that have occurred, determines, as the events that have occurred, only events that are equal to or greater than the threshold with respect to each of the thresholds a, and calculates a feature amount related to event occurrence intervals. Specifically, the feature amount calculating unit 21 extracts a plurality of specific events that have values greater than the threshold a from among a plurality of events that have occurred in chronological order during a specific time period, with respect to each of the thresholds a that are changed. Then, the feature amount calculating unit 21 generates a feature amount related to occurrence intervals of the plurality of specific events, from the plurality of specific events.

For example, the feature amount calculating unit 21 reads the point process time series data from the learning data DB 13, and identifies a maximum event value (maximum value) and a minimum event value (minimum value) among events that have occurred in the point process time series data. Then, the feature amount calculating unit 21 equally divides event values from the minimum value to the maximum value by a designated number. Thereafter, the feature amount calculating unit 21 determines only events that are equal to or greater than the threshold as events that have occurred, with respect to each of the thresholds during the process of changing the threshold at regular intervals from the minimum value to the maximum value, and extracts event occurrence intervals. Then, the feature amount calculating unit 21 calculates a feature amount of the event occurrence intervals that are extracted for each of the thresholds, by using probability distribution, chaotic time series analysis, persistent homology, or the like. Meanwhile, the magnitudes of the events may be normalized from 0 to 1.

Figure 4:
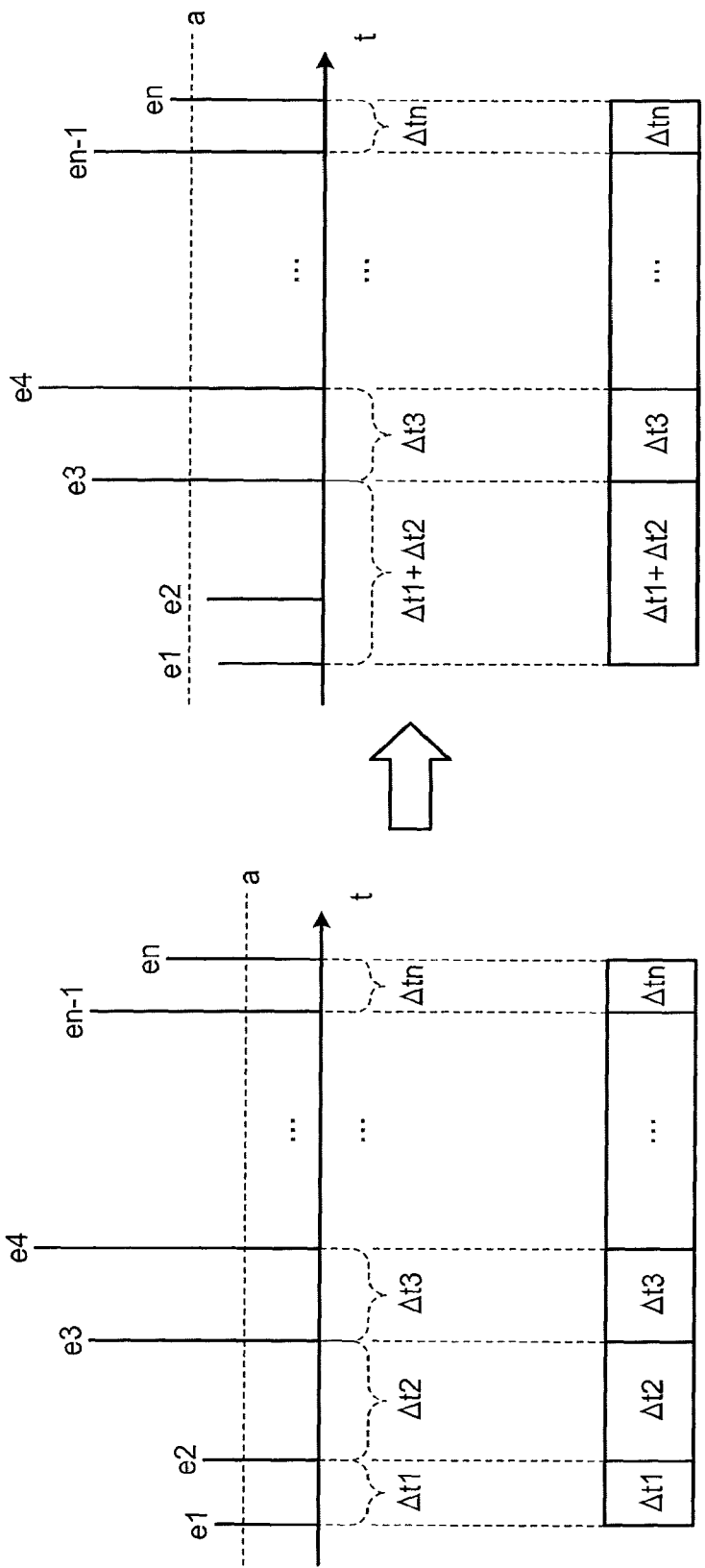
FIG. 4 is a diagram for explaining an example of extraction of events.

Extraction of events will be described below. FIG. 4 is a diagram for explaining an example of extraction of events. In FIG. 4, point process time series data in which n events, i.e., an event e1 to an event en, have occurred is illustrated as an example. First, as illustrated in the left part of FIG. 4, the feature amount calculating unit 21 identifies "e1, e2, e3, e4 ... en−1, en" as events that are equal to or greater than the threshold a. Subsequently, the feature amount calculating unit 21 identifies "Δt1, Δt2, Δt3, ... , Δtn" as occurrence intervals between the events. For example, the feature amount calculating unit 21 identifies an occurrence interval between the event e1 and the event e2 as "$\Delta t1$", and identifies an occurrence interval between the event e2 and the event e3 as "$\Delta t2$". Then, the feature amount calculating unit 21 calculates a feature amount of the event occurrence intervals "$\Delta t1, \Delta t2, \Delta t3, \ldots, \Delta tn$" as a feature amount for the threshold a.

Further, as illustrated in the right part of FIG. 4, the feature amount calculating unit 21 calculates a new threshold a by increasing the previous threshold a by a predetermined value, and identifies "e1, e3, e4 . . . en−1, en" as events that are equal to or greater than the new threshold a. Subsequently, the feature amount calculating unit 21 identifies "$\Delta t1+\Delta t2, \Delta t3, \ldots, \Delta tn$" as occurrence intervals between the events. Then, the feature amount calculating unit 21 calculates a feature amount of the event occurrence intervals "$\Delta t1+\Delta t2, \Delta t3, \ldots, \Delta tn$" as a feature amount for the new threshold a.

Figure 5:
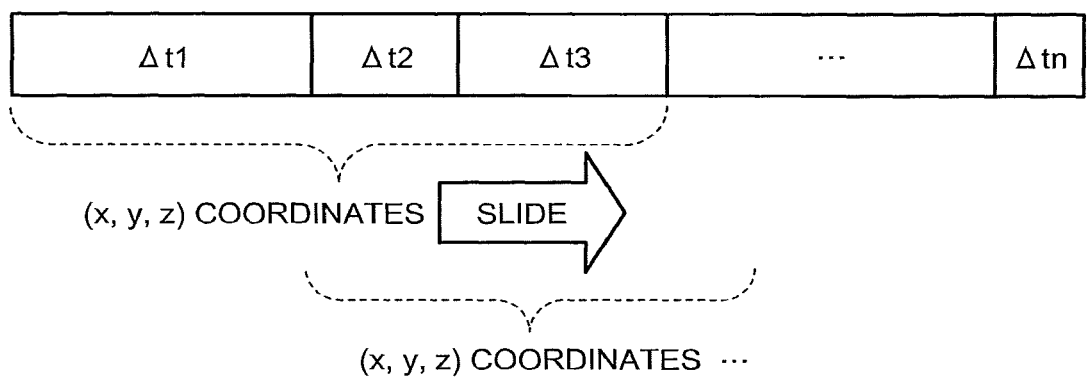
FIG. 5 is a diagram for explaining an example of generation of an interval attractor.
Figure 6A:
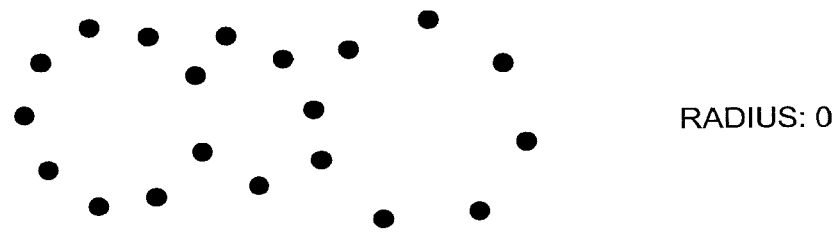
FIGS. 6A to 6D are diagrams for explaining persistent homology.
Figure 6B:
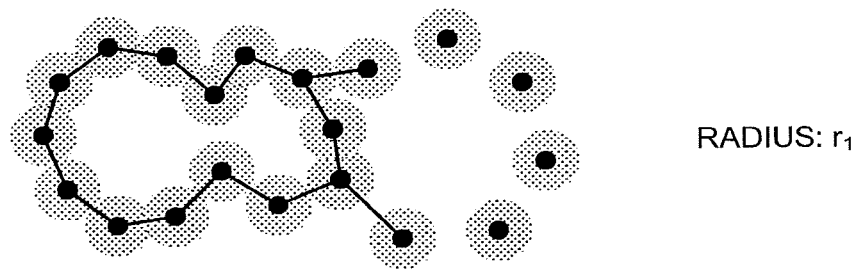
Figure 6C:
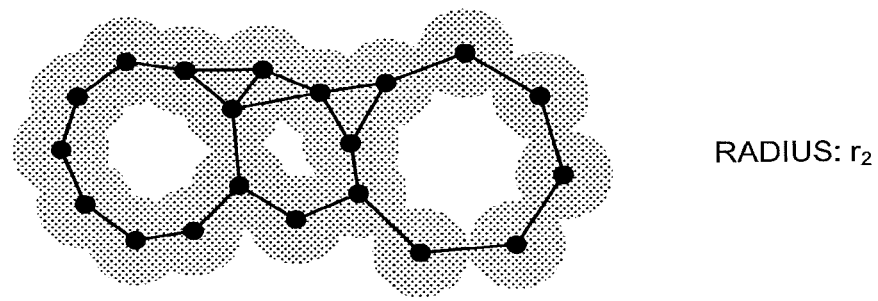
Figure 6D:
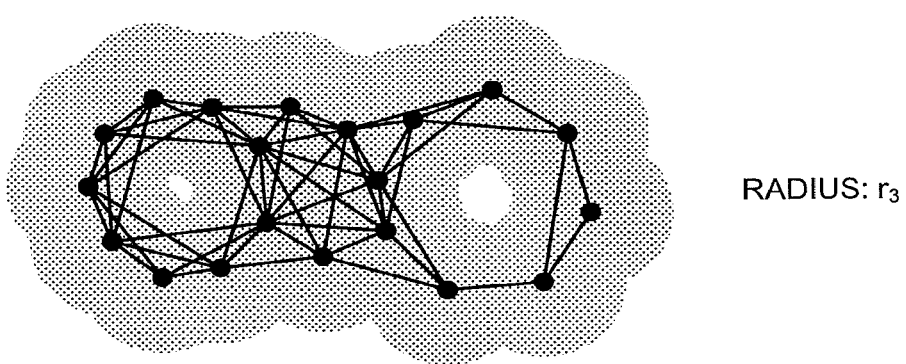

As one example of calculation of the feature amount, an example of calculation using persistent homology will be described with reference to FIG. 5 to FIG. 7. FIG. 5 is a diagram for explaining an example of generation of an interval attractor. FIGS. 6A to 6D are diagrams for explaining the persistent homology. FIG. 7 is a diagram for explaining a relationship between barcode data and generated continuous data.

Specifically, the feature amount calculating unit 21 generates an interval vector that contains the event occurrence intervals as a plurality of components, and generates local variable points each of which contains specific components as one set of coordinates, from a predetermined number of consecutive interval vectors in chronological order. Then, the feature amount calculating unit 21 generates a Betti sequence by applying persistent homology transform to a plurality of local variable points for which the interval vectors serving as starting points are different. Meanwhile, the feature amount calculating unit 21 is able to process "a plurality of events" in a certain interval, such as a time interval, that is separated under a specific condition.

More specifically, the feature amount calculating unit 21 generates an interval vector that contains the event occurrence intervals "$\Delta t1, \Delta t2, \Delta t3, \ldots, \Delta tn$" at the threshold a as components (elements). Subsequently, the feature amount calculating unit 21 generates a plurality of coordinates by sliding the elements (components) of the interval vector. For example, as illustrated in FIG. 5, the feature amount calculating unit 21 extracts "$\Delta t1, \Delta t2, \Delta t3$" as "x, y, z" coordinates and subsequently extracts "$\Delta t2, \Delta t3, \Delta t4$" as "x, y, z" coordinates from the event occurrence intervals ($\Delta t1, \Delta t2, \Delta t3 \ldots \Delta tn$) that are the elements of the interval vector. In this example, it may be possible to slide the elements until it becomes impossible to obtain three-dimensional elements, or it may be possible to repeatedly slide the elements until the last occurrence interval corresponds to the x coordinate (in this case, the y coordinate and the z coordinate are zero).

Subsequently, the feature amount calculating unit 21 generates a quasi-attractor from each of the extracted coordinates (each of the interval attractors), and transforms the quasi-attractor into a Betti sequence using persistent homology transform. Meanwhile, the attractor generated at this time is a set of a finite number of points, and therefore referred to as the "quasi-attractor". As for the transformation into a Betti sequence, a technique described in Japanese Laid-open Patent Publication No. 2017-97643 may be used.

The transformation into a Betti sequence will be briefly described below. First, "homology" is a technique that represents a target feature by the number of holes in m dimensions (m≥0). The "hole" described here is an element of a homology group, where a zero-dimensional hole is a connected component, a one-dimensional hole is a hole (tunnel), and a two-dimensional hole is a cavity. The number of holes in each of the dimensions is referred to as a Betti number. "Persistent homology" is a technique for characterizing transition of an m-dimensional hole in a target (in this example, a set of points (point cloud)), and it is possible to examine a feature related to arrangement of points using the persistent homology. In this technique, each of the points in a target is gradually expanded into a sphere, and a time point at which each of the holes is born in the process (which is represented by a radius of a sphere at the birth time) and a time point at which each of the holes dies (which is represented by a radius of a sphere at the death time) are identified.

The persistent homology will be described in detail below with reference to FIGS. 6A to 6D. As a rule, when a single sphere comes into contact with a certain sphere, centers of the two spheres are connected by a line segment, and when three spheres come into contact with one another, centers of the three spheres are connected by line segments. In this example, only connected components and holes are taken into consideration. In a case illustrated in FIG. 6A (radius r=0), only connected components are born and no hole is born. In a case illustrated in FIG. 6B (radius $r=r_1$), a hole is born and some of the connected components die. In a case illustrated in FIG. 6C (radius $r=r_2$), an increased number of holes are born, and a single connected component remains alive. In a case illustrated in FIG. 6D (radius $r=r_3$), the number of connected components remains one, and one of the holes dies. Meanwhile, each of black points illustrated in FIGS. 6A to 6D corresponds to each of interval attractors.

In a process of persistent homology calculation, the birth radius and the death radius of an element (i.e., a hole) are calculated. By using the birth radius and the death radius of the hole, it is possible to generate barcode data. The barcode data is generated for each of hole dimensions; therefore, by integrating pieces of barcode data in a plurality of hole dimensions, a single piece of barcode data is generated. The continuous data is data indicating a relationship between the radius (i.e., a time) of a sphere in the persistent homology and the Betti number.

A relationship between the barcode data and the generated continuous data will be described with reference to FIG. 7. An upper graph is a graph generated from the barcode data, in which the horizontal axis represents a radius. A lower graph is a graph generated from the continuous data (may be described as a Betti sequence), in which the vertical axis represents the Betti number and the horizontal axis represents a time. As described above, the Betti number represents the number of holes; for example, the number of existing holes is 10 when a radius corresponds to a dashed line in the upper graph, and thus the Betti number corresponding to the dashed line in the lower graph is 10. The Betti number is counted for each of blocks. Meanwhile, the lower graph is a graph of quasi time series data, and therefore, a value of the horizontal axis does not have particular meaning.

Basically, the same continuous data is obtained from the same barcode data. In other words, when original quasi attractors are the same, pieces of the same continuous data are obtained. However, in some cases, pieces of the same continuous data may be obtained from pieces of different barcode data although such a case is rare. An analogous relationship between continuous data that is generated from certain barcode data and continuous data that is generated from different barcode data is equivalent to an analogous relationship between pieces of barcode data as long as the above-described rare case does not occur. In view of the above, although the definition of a distance between pieces of data varies, an analogous relationship between pieces of continuous data that are generated from the barcode data is mostly equivalent to the analogous relationship between pieces of original continuous data.

As described above, the feature amount calculating unit 21 generates an interval vector from each of the event occurrence intervals that are acquired by changing the threshold, performs persistent homology transform, and generates a Betti sequence corresponding to each of the thresholds. Each of the Betti sequences serves as each of feature amounts corresponding to each of the thresholds. Then, the feature amount calculating unit 21 outputs the thresholds and the Betti sequences in an associated manner to the feature amount generating unit 22.

Referring back to FIG. 2, the feature amount generating unit 22 is a processing unit that generates feature amounts of the point process time series data by using each of the feature amounts corresponding to each of the thresholds calculated by the feature amount calculating unit 21. Specifically, the feature amount generating unit 22 changes the threshold and generates array data corresponding to a plurality of events from points each containing the threshold and the feature amount as components. For example, the feature amount generating unit 22 generates array data, in which the feature amounts (Betti sequences) corresponding to the respective thresholds are arrayed, as feature amounts of the point process time series data.

In addition, the feature amount generating unit 22 may obtain a single feature amount by arranging the Betti sequences (feature amount vectors) in sequence with respect to each of the thresholds a. For example, when the dimension of the feature vector is large, it may be useful to cause the feature amount generating unit 22 to arrange a single feature amount vector on the vertical axis along with a change in the threshold a and handle the vector as an image.

FIG. 8 is a diagram for explaining an example of array display. Here, an example is illustrated in which the magnitudes of events are normalized to 0 to 1, and the threshold a is changed from 0 to 1 at equal intervals. The feature amount generating unit 22 represents each of the Betti sequences corresponding to each of the thresholds by a vector. Then, as illustrated in FIG. 8, the feature amount generating unit 22 generates array data, in which the vertical axis represents the threshold a and the vector representations (Betti sequences) corresponding to the respective thresholds are arranged. In other words, the Betti number is stored in each of cells. Thereafter, the feature amount generating unit 22 outputs the generated array data as the feature amounts of the point process time series data to the learning unit 23.

Figure 9:
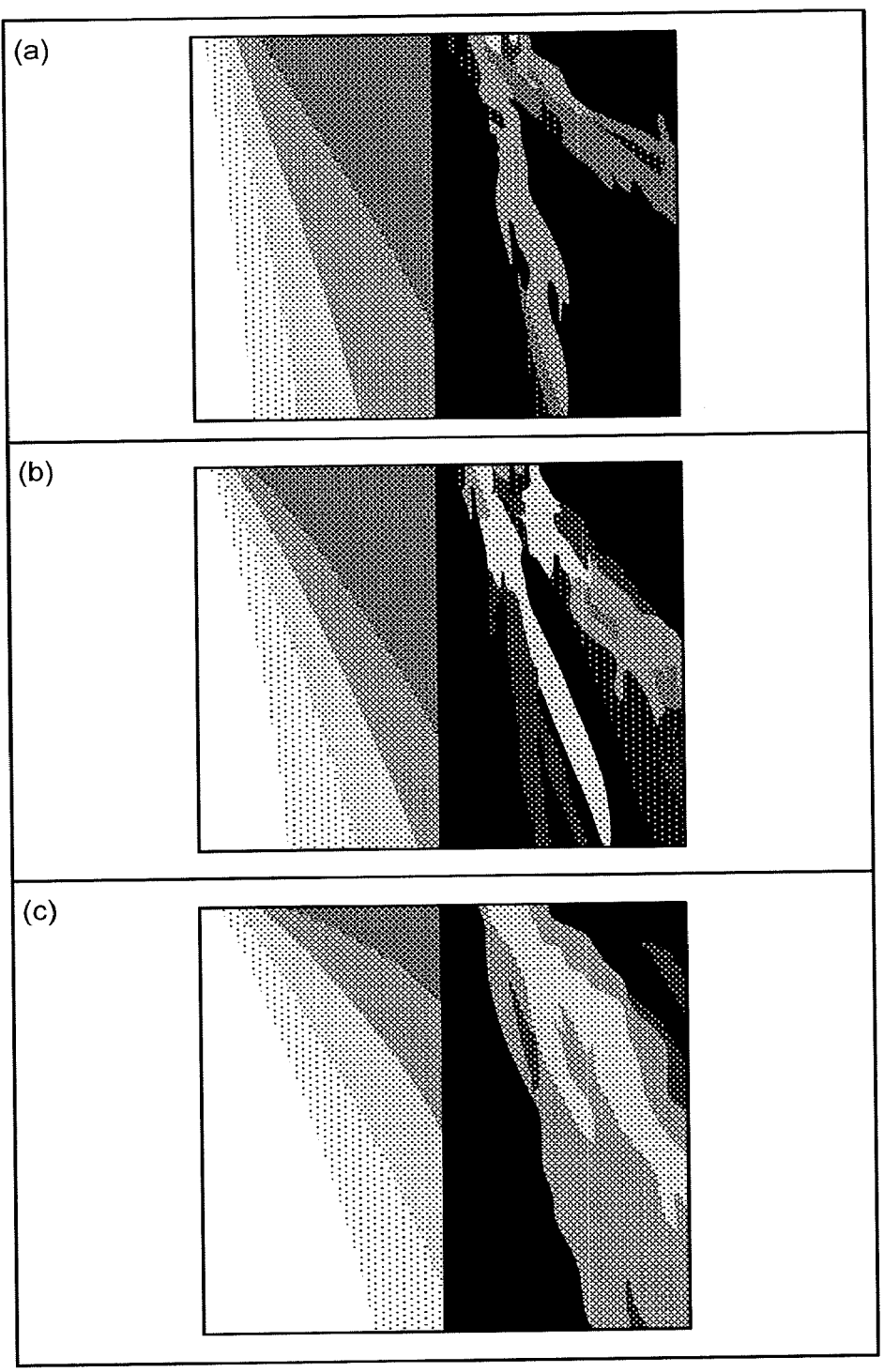
FIG. 9 is a diagram for explaining an example of feature amounts using images.

Furthermore, the feature amount generating unit 22 is able to handle the generated array data as an image. FIG. 9 is a diagram for explaining an example of feature amounts using images. The feature amount generating unit 22 is able to generate each of feature images as illustrated in FIG. 9 by changing a color or a density or by performing conversion into a value, by using the Betti number or the like in each of the cells in the array data illustrated in FIG. 8. Each of the images illustrated in FIG. 9 is an image generated from different point process time series data. When a feature image illustrated in FIG. 9(a) and a feature image illustrated in FIG. 9(b) are compared, densities of white areas are different. Further, when the feature image illustrated in FIG. 9(a) and a feature image illustrated in FIG. 9(c) are compared, shapes of white areas are different. Therefore, by performing classification based on the feature images generated by the method of the embodiment, it is possible to classify each of the images illustrated in FIGS. 9(a), (b), and (c).

Referring back to FIG. 2, the learning unit 23 is a processing unit that distinguishes the point process time series data by using the feature amounts generated by the feature amount generating unit 22, and performs a learning process. The learning unit 23 classifies the point process time series data according to each of the events by using the feature amounts. In other words, the learning unit 23 classifies each piece of the point process time series data as an event A, or classifies each piece of the point process time series data as an event B, for example. Then, the learning unit 23 performs learning by DL or the like so that events can be classified based on the feature amounts of the point process time series data, and stores a learning result in the learning result DB 14. The learning result may include a classification result of the point process time series data (that is, output of learning by DL), or various parameters of a neural network that are used to calculate output from input. Further, the learning according to the embodiment may be supervised learning or unsupervised learning. Meanwhile, the learning is not limited to DL, but general machine learning may be adopted.

Flow of Process

Figure 10:
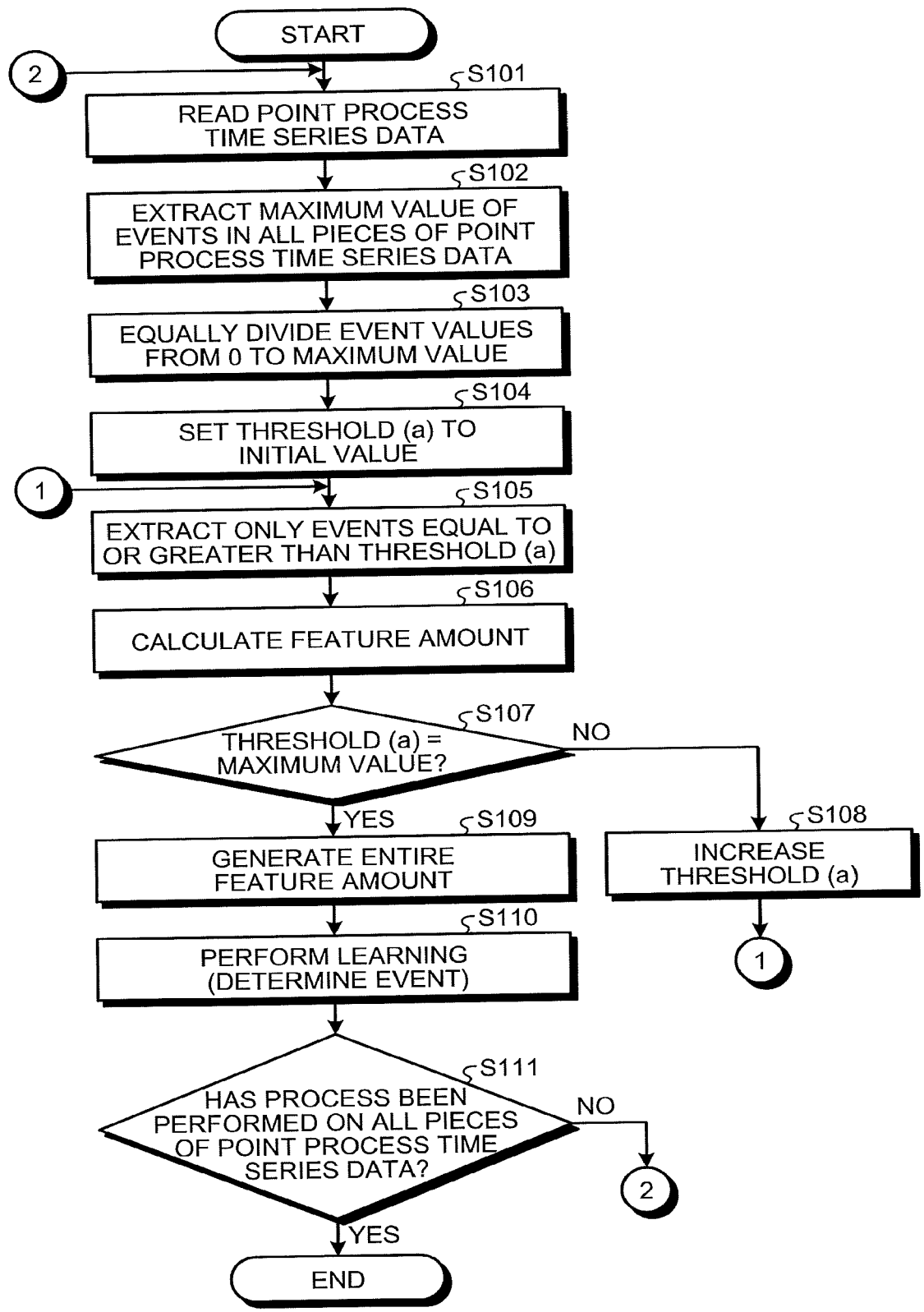
FIG. 10 is a flowchart illustrating the flow of a learning process.

Next, the learning process as described above will be explained. FIG. 10 is a flowchart illustrating the flow of the learning process. The process illustrated in FIG. 10 is performed for each piece of point process time series data. As illustrated in FIG. 10, the feature amount calculating unit 21 reads the point process time series data from the learning data DB 13 (S101).

Subsequently, the feature amount calculating unit 21 extracts a maximum value of events in the point process time series data (S102), and equally divides event values from 0 to the maximum value by a designated number (S103). Meanwhile, the feature amount calculating unit 21 may equally divide the event values from the minimum value to the maximum value of the events in the point process time series data by the designated number.

Then, the feature amount calculating unit 21 sets the threshold a to an initial value (for example, 0) (S104), and extracts only events that are equal to or greater than the threshold a (S105). Subsequently, the feature amount calculating unit 21 calculates a feature amount using the event intervals of the extracted events (S106).

Thereafter, if the threshold a is not the maximum value (S107: No), the feature amount calculating unit 21 increases the threshold a by the predetermined number (S108), and performs the process from S105.

Further, if the threshold a is the maximum value (S107: Yes), the feature amount generating unit 22 generates a feature amount of all pieces of the point process time series data using each of the feature amounts calculated by the feature amount calculating unit 21 (S109).

Thereafter, the learning unit 23 discriminates the point process time series data using the feature amount of all pieces of the point process time series data generated by the feature amount generating unit 22, and learns a relationship between the feature amount and an event (S110).

Then, if there is a piece of point process time series data that has not been processed (S111: No), the process is repeated from S101. If the process is completed for all pieces of the point process time series data (S111: Yes), the learning process is terminated.

Effects

As described above, the determination apparatus 10 is able to generate a feature amount with respect to a value of each of the thresholds a. Because the feature amount is obtained by using only the event intervals, information on the event intervals is not lost but minute information on the events is removed along with a change in the threshold a; therefore, a change in the feature amount along with the change in the threshold a represents a relationship between event values and event intervals. In other words, the determination apparatus 10 is able to represent a relationship between the event values and the event intervals while storing information on the event intervals, on the basis of the event intervals. As a result, the determination apparatus 10 is able to analyze the point process time series data by taking into account both of the event values and the event intervals, so that it is possible to accurately determine events from the point process time series data.

Figures 11, 12:
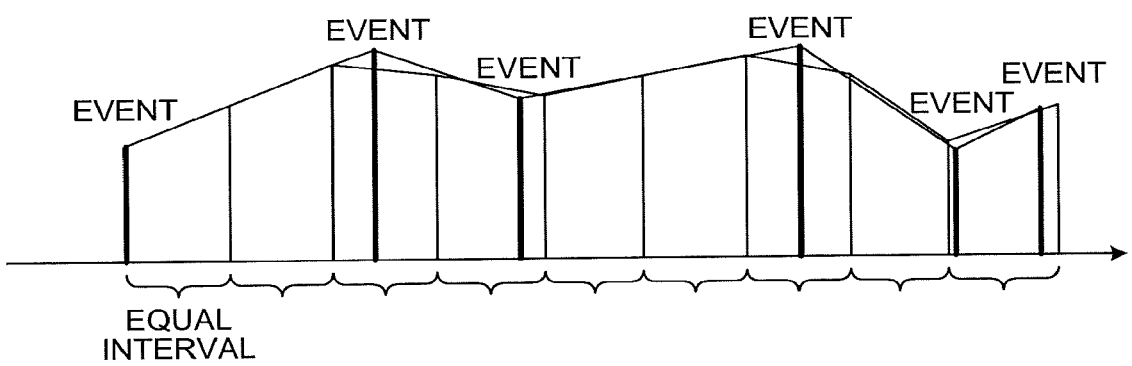
FIG. 11 is a diagram for explaining labeling on experimental data.
FIG. 12 is a diagram for explaining time series interpolation that is a general technology.

An experimental result of comparison between the method according to the first embodiment and a conventional method will be described below. First, an experimental condition will be described. As for event occurrence intervals, it is assumed that events occur with a normal distribution and a uniform distribution. As for labels, a label 1 is assigned to data for which a random number is generated in accordance with a normal distribution on the time axis, a label 2 is assigned to data for which an event occurs in accordance with the sine function, and labeling is performed by combining these labels. FIG. 11 is a diagram for explaining labeling on the experimental data. As illustrated in FIG. 11, in the experimental data, the label 1 is assigned to data for which the event value follows the normal distribution and the event occurrence interval follows the normal distribution, the label 2 is assigned to data for which the event value follows the normal distribution and the event occurrence interval follows the uniform distribution, a label 3 is assigned to data for which the event value follows the sine function and the event occurrence interval follows the normal distribution, and a label 4 is assigned to data for which the event value follows the sine function and the event occurrence interval follows the uniform distribution.

Next, a method of the comparison experiment will be described. In this example, a general method using statistics of event intervals and a time series interpolation method are adopted in addition to the method according to the first embodiment. FIG. 12 is a diagram for explaining the time series interpolation that is a general technique. As illustrated in FIG. 12, the time series interpolation is an interpolation method by treating a point process as time series of a certain interval, and, in this method, information on the event occurrence intervals is lost and an error from an actual value is large.

FIG. 13 is a diagram for explaining an experimental result. In this example, learning was performed by inputting the point process time series data with each of the labels, and, after the learning, when the point process time series data of the label 1 was input as an estimation target for example, and if the label 1 was estimated, it was determined that a correct answer was obtained, whereas if a different label was estimated, it was determined that a wrong answer was obtained. As illustrated in FIG. 13, the percentage of correct answers in the method according to the first embodiment was 100%, which is high accuracy, but the percentage of correct answers in the other methods remained at low accuracy. Further, from the viewpoint of the percentage of correct answers for each of the labels, in the general method, it was possible to distinguish a difference between the event occurrence intervals, but it was impossible to distinguish the event values. Furthermore, in the time series interpolation, it was possible to distinguish a difference between the event values, but it was impossible to distinguish a difference between the event occurrence intervals.

FIG. 14 is a diagram for explaining details of the experimental result. In FIG. 14, a matrix diagram of correct answer labels and estimated labels is illustrated. For example, a percentage at which the point process time series data assigned with the label 1 was estimated as the label 1, a percentage at which the point process time series data assigned with the label 1 was estimated as the label 2, a percentage at which the point process time series data assigned with the label 1 was estimated as the label 3, and a percentage at which the point process time series data assigned with the label 1 was estimated as the label 4 are illustrated.

As illustrated in FIG. 14, in the general method, it was possible to estimate the event occurrence intervals, but the event values were randomly estimated. Further, in the time series interpolation, it was possible to estimate the event values, but the event occurrence intervals were randomly estimated. In contrast, in the method according to the first embodiment, both of the event occurrence intervals and the event values were correctly estimated.

[b] Second Embodiment

While the embodiment of the present invention has been described above, the present invention may be embodied in various different forms other than the embodiment as described above.

Target

For example, the interval vector generation process and the determination process may be performed on "a plurality of events" in a certain interval, such as a time interval, that is separated under a specific condition.

Learning Method

The learning of the first embodiment is not limited to DL, but other kinds of machine learning may be adopted. Further, the number of dimensions of the interval attractor may be set arbitrarily. When a label of data serving as an estimation target is to be estimated after learning, the same process as that of the learning is performed and a processing result is input to a learning model.

Calculation of Feature Amount

In the first embodiment, an example has been described in which the feature amount is calculated through the persistent homology transform; however, embodiments are not limited to this example. For example, it may be possible to calculate the feature amounts using a probability distribution, chaotic time series analysis, or the like. This is effective particularly when the event occurrence interval or the like follows a probability distribution or a chaotic theory. In addition, the feature amounts of all pieces of the point process time series data need not be handled as an image, but it may be possible to distinguish the feature amounts using an array.

Meanwhile, as for the method of changing the threshold a, it may be possible to arbitrarily change the setting, instead of using a certain interval. In addition, the method is not limited to the persistent homology transform, but it may be possible to adopt any method, such as a method of generating a feature amount from a plurality of points or vectors at different times.

Hardware

Figure 15:
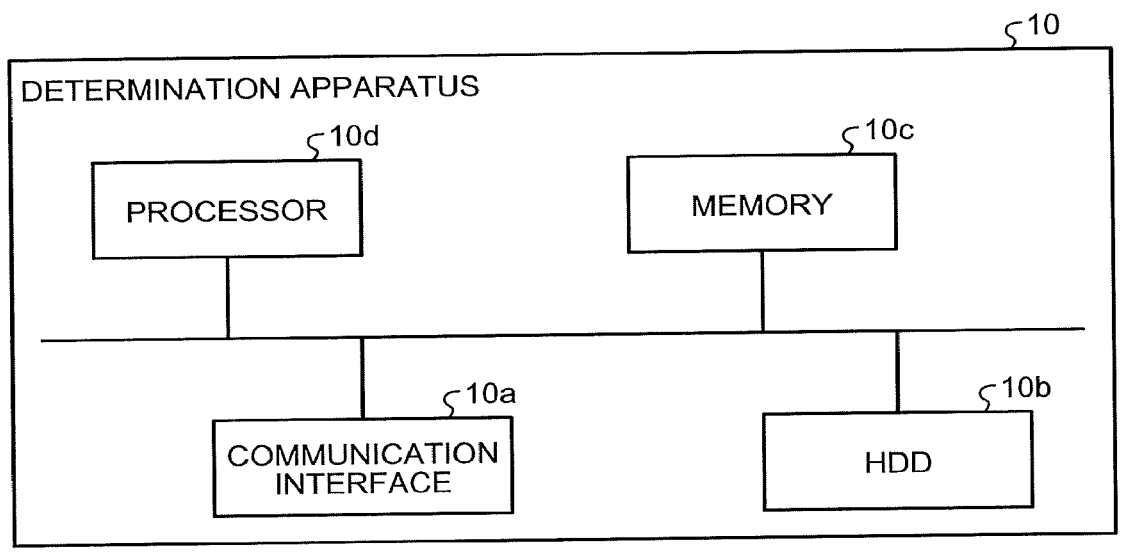
FIG. 15 is a diagram for explaining a hardware configuration example.

FIG. 15 is a diagram for explaining a hardware configuration example. As illustrated in FIG. 15, the determination apparatus 10 includes a communication interface 10a, a hard disk drive (HDD) 10b, a memory 10c, and a processor 10d. Further, the units illustrated in FIG. 15 are connected to one another via a bus or the like.

The communication interface 10a is a network interface card or the like, and communicates with other servers. The HDD 10b stores therein a program or a DB for implementing the functions illustrated in FIG. 2.

The processor 10d reads a program for executing the same process as that of each of the processing units illustrated in FIG. 2 from the HDD 10b or the like, loads the program onto the memory 10c, and operates a process for implementing each of the functions described with reference to FIG. 2 for example. In other words, the processes implement the same function as that of each of the processing units included in the determination apparatus 10. Specifically, the processor 10d reads, from the HDD 10b or the like, a program that has the same functions as those of the feature amount calculating unit 21, the feature amount generating unit 22, the learning unit 23, and the like. Then, the processor 10d performs a process that executes the same processes as those of the feature amount calculating unit 21, the feature amount generating unit 22, the learning unit 23, and the like.

As described above, the determination apparatus 10, by reading and executing the program, functions as an information processing apparatus that implements the determination method. Further, the determination apparatus 10 is able to cause a medium reading device to read the above-described program from a recording medium and executes the read program to thereby implement the same functions as those of the embodiment described above. The program described in the present embodiment need not always be performed by the determination apparatus 10. For example, even when a different computer or server executes the program or even when the different computer and server execute the program in cooperation with each other, it is possible to apply the present invention in the same manner.

System

The processing procedures, control procedures, specific names, and information including various kinds of data and parameters illustrated in the above-described document and drawings may be arbitrarily changed unless otherwise specified.

In addition, each component of each device illustrated in the drawings is a functional idea and thus is not always be configured physically as illustrated in the drawings. In other words, specific forms of distribution and integration of the apparatuses are not limited to those illustrated in the drawings. That is, all or part of the apparatuses may be functionally or physically distributed or integrated in arbitrary units depending on various loads or use conditions. For example, it may be possible to realize a processing unit that displays an item and a processing unit that estimates selection by separate bodies. Further, for each processing function performed by each apparatus, all or any part of the processing functions may be implemented by a CPU and a program analyzed and executed by the CPU or may be implemented as hardware by wired logic.

According to one embodiment, it is possible to determine an event from the point process time series data.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a determination program that causes a computer to execute a process comprising:
   extracting a plurality of specific events that have values greater than an event determination threshold from among a plurality of events that have occurred in chronological order;
   generating a feature amount related to adjacent occurrence intervals of the plurality of specific events, using the plurality of specific events;
   generating array data corresponding to the plurality of events using points each having components of the event determination threshold and the feature amount, while changing the event determination threshold; and
   determining a type of the plurality of events using the array data.

2. The non-transitory computer-readable recording medium according to claim 1, further comprising:
   generating an interval vector that includes, as a plurality of components, adjacent occurrence intervals between the plurality of specific events;
   generating local variable points each of which includes specific components as one set of coordinates, using a predetermined number of consecutive interval vectors in the chronological order;
   generating a Betti sequence by applying persistent homology transform to a plurality of local variable points for which the interval vectors serving as starting points are different; and
   generating image data corresponding to the plurality of events using points each of which includes the event determination threshold and the Betti sequence as components.

3. The non-transitory computer-readable recording medium according to claim 1, further comprising:
   generating image data using the array data; and
   determining a type of the plurality of events using the image data.

4. The non-transitory computer-readable recording medium according to claim 3, wherein pixel values of the image data are different from a value related to the feature amount.

5. The non-transitory computer-readable recording medium according to claim 1, further comprising:
   generating a plurality of vectors at different times using each of the adjacent occurrence intervals of the plurality of specific events; and
   generating the feature amount related to the adjacent occurrence intervals of the plurality of specific events using the plurality of generated vectors.

6. A determination method comprising:
   extracting a plurality of specific events that have values greater than an event determination threshold from among a plurality of events that have occurred in chronological order, using a processor;
   generating a feature amount related to adjacent occurrence intervals of the plurality of specific events, using the plurality of specific events, using the processor;

generating array data corresponding to the plurality of events using points each having components of the event determination threshold and the feature amount, while changing the event determination threshold, using the processor; and determining a type of the plurality of events using the array data, using the processor.

7. A determination apparatus comprising:

a processor configured to:

extract a plurality of specific events that have values greater than an event determination threshold from among a plurality of events that have occurred in chronological order;

generate a feature amount related to adjacent occurrence intervals of the plurality of specific events, using the plurality of specific events;

generate array data corresponding to the plurality of events using points each having components of the event determination threshold and the feature amount, while changing the event determination threshold; and determine a type of the plurality of events using the array data.

* * * * *